United States Patent [19]
Huang

[11] Patent Number: 5,865,606
[45] Date of Patent: Feb. 2, 1999

[54] SLURRY SUPPLYING MECHANISM

[76] Inventor: Yu Lin Huang, 18, Lane 456, Jeng Der Road, Tzuo Yin Chu, Kaoshiung, Taiwan

[21] Appl. No.: 856,340

[22] Filed: May 14, 1997

[51] Int. Cl.[6] .............................. F04B 39/10; F04B 15/02

[52] U.S. Cl. ............................................ 417/532; 417/900

[58] Field of Search ...................................... 417/532, 900

[56] References Cited

U.S. PATENT DOCUMENTS 3,829,254  8/1974  Stetter et al. ........................... 417/900

FOREIGN PATENT DOCUMENTS 2632-816 A1  1/1978  Germany ................................ 417/900
931-954      5/1982  U.S.S.R. ................................ 417/900

*Primary Examiner*—Timothy S. Thorpe
*Assistant Examiner*—Cheryl J. Tyler

[57] ABSTRACT

A mechanism for pumping slurry includes a housing for receiving the slurry and two cylinders secured to the housing for drawing the slurry into and out of cylinders. A pipe is pivotally secured to the housing and has one end for selectively aligning with either of the openings and for allowing the slurry to be supplied into the pipe by the cylinders alternatively. The housing includes a pivotal follower for rotating the pipe and one or more actuators for rotating the follower and the pipe.

3 Claims, 4 Drawing Sheets

SLURRY SUPPLYING MECHANISM

BACKGROUND OF THE INVENTION

1. Field of the Invention

The present invention relates to a slurry supplying mechanism, and more particularly to a mechanism continuously supplying slurry.

2. Description of the Prior Art

Typical slurry supplying mechanisms comprise a single cylinder for pumping slurry to an upper portion. However, the cylinder is actuated in a reciprocating action such that the slurry may not be continuously pumped and supplied to the upper portion by the single cylinder.

The present invention has arisen to mitigate and/or obviate the afore-described disadvantages of the conventional slurry supplying mechanisms.

SUMMARY OF THE INVENTION

The primary objective of the present invention is to provide a mechanism for continuously supplying slurry to the upper portion.

In accordance with one aspect of the invention, there is provided a mechanism for pumping and for supplying slurry, the mechanism comprises a housing for receiving the slurry, the housing including a first opening and a second opening, a first cylinder and a second cylinder secured to the housing and communicating with the first opening and the second opening for allowing the first and the second cylinders to draw the slurry into and out of the first and the second cylinders, a pipe pivotally secured to the housing and including a first end adapted to be aligned with either of the first opening and the second opening, and means for selectively aligning the first end of the pipe with the first opening and the second opening and for allowing the slurry to be supplied into the pipe by the cylinders alternatively. The slurry may thus be supplied to the higher portion by the two cylinders.

The pipe includes an axle, the housing includes a pivotal follower for engaging with the axle and for rotating the pipe, and the selectively aligning means includes means for rotating the follower and for rotating the pipe.

The follower includes a recess for engaging with the axle and for rotating the pipe when the follower is rotated.

The rotating means includes at least one arm secured to pivotal follower at least one actuator secured to the arm for rotating the arm and thus for rotating the follower and the pipe.

The selectively aligning means further includes means for selectively forcing the pipe toward and to engage with the first and the second openings.

The forcing means includes a barrel rotatably secured to the housing, the pipe includes a sealing ring engaged with the barrel for making an air tight seal between the barrel and the pipe, and the barrel includes an inlet for allowing air to be supplied into the barrel and for selectively forcing the pipe to engage with the first and the second openings.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
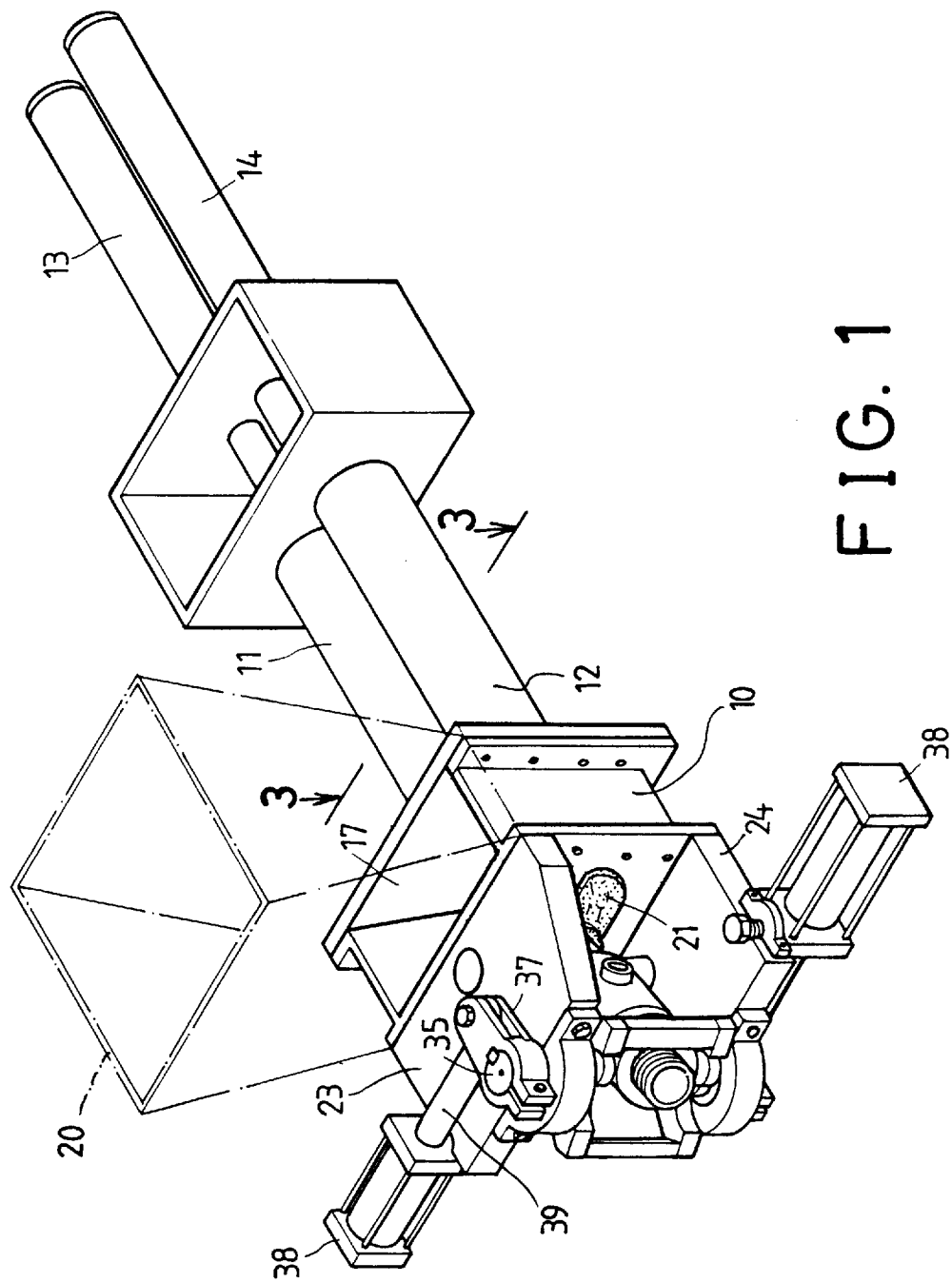
FIG. 1 is a perspective view of a slurry supplying mechanism in accordance with the present invention.
Figure 2:
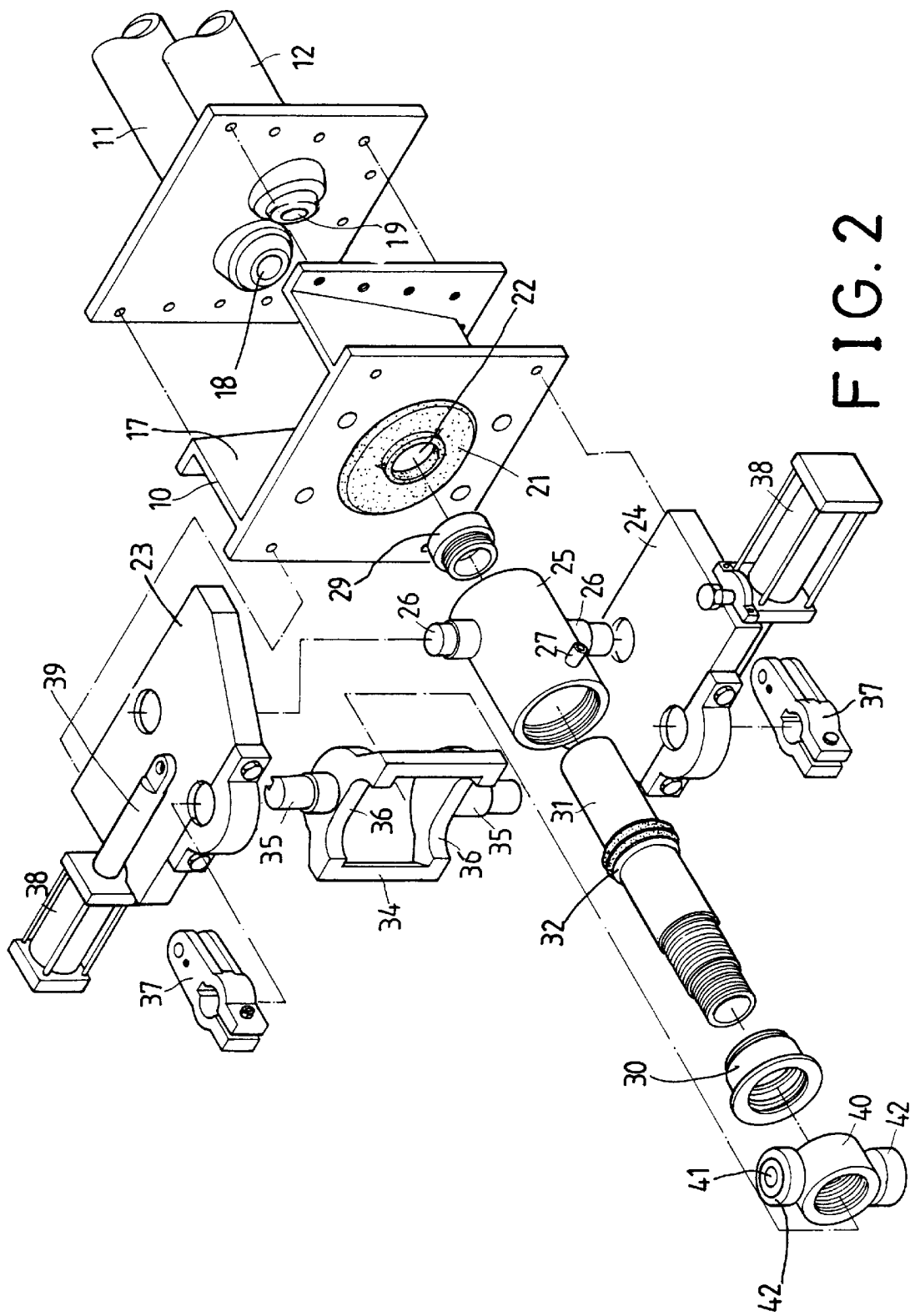
FIG. 2 is an exploded view of the slurry supplying mechanism.
Figure 3:
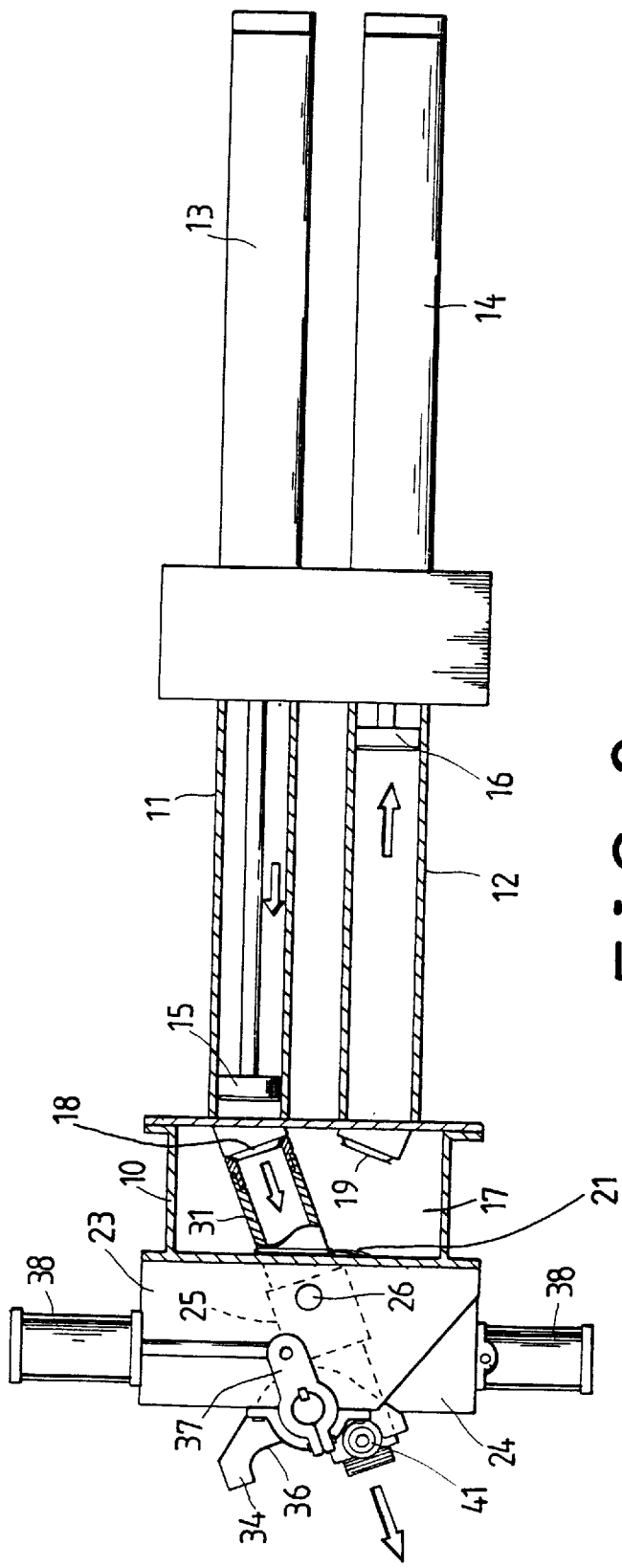
FIG. 3 is a partial cross sectional view taken along lines 3—3 of FIG. 1.

Referring to the drawings, and initially to FIGS. 1–3, a slurry supplying mechanism in accordance with the present invention comprises a housing 10 and two tubes 11, 12 secured to the housing 10 and having two openings 18, 19 communicating with the interior 17 of the housing 10. A funnel 20 is disposed on the housing 10 for allowing slurry to be supplied into the housing 10. Two cylinders 13, 14 are secured to the tubes 11, 12 and each includes a piston 15, 16 slidably engaged in the tubes 11, 12 for drawing the slurry in the housing 10 into the tubes 11, 12 and for pumping the slurry out of the tubes 11, 12. The housing 10 includes a resilient pad 21 having an orifice 22, and includes two panels 23, 24 extended away from the tubes 11, 12. The tubes 11, 12 may be taken as the outer housings of the cylinders; i.e., the tubes 11, 12 and the cylinders 13, 14 may be taken as two cylinders 11, 12.

Figure 4:
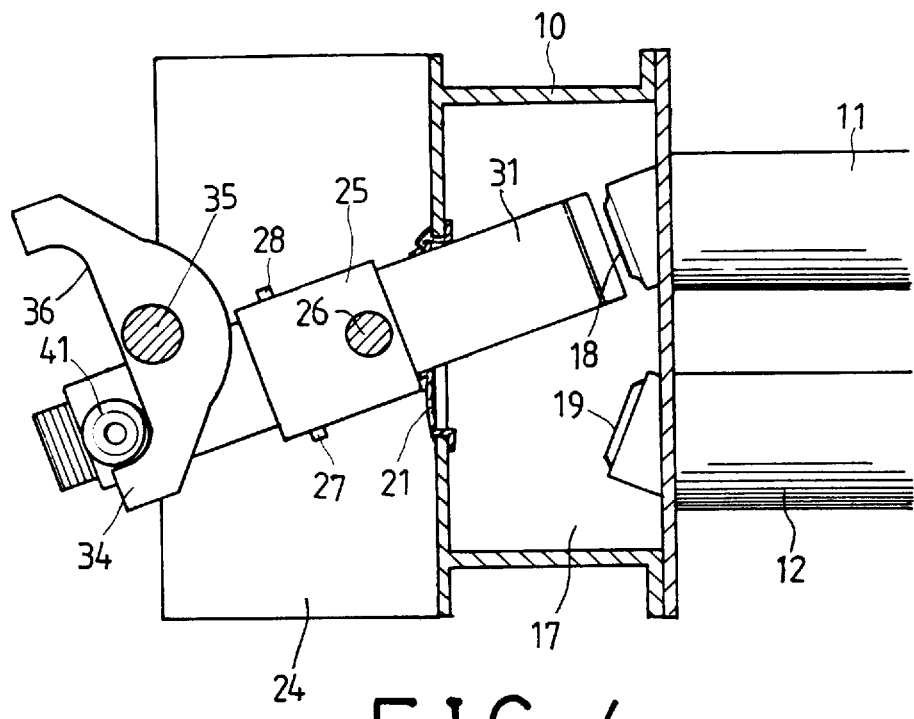
FIGS. 4 and 5 are cross sectional views taken along lines 3—3 of FIG. 1, illustrating the operation of the slurry supplying mechanism.
Figure 5:
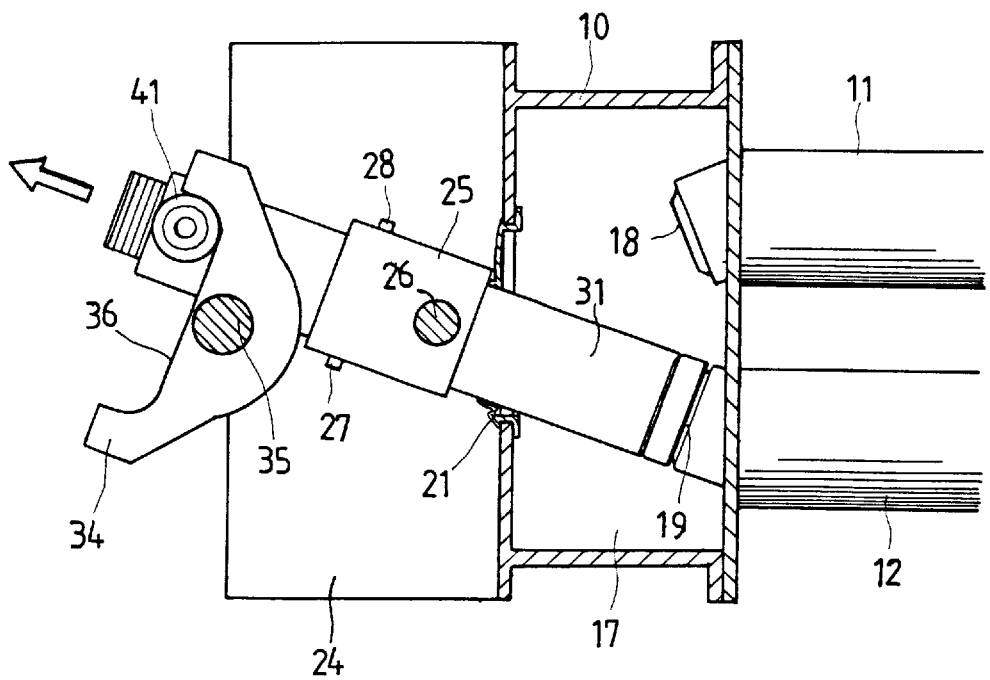

A barrel 25 is pivotally secured between the panels 23, 24 at a pivot shaft 26 and includes an inlet 27 and an outlet 28 (FIGS. 4, 5). A pipe 31 is slidably engaged in the barrel 25 and includes a sealing ring 32 for making an air tight seal between the pipe 31 and the barrel 25. Two caps 29, 30 are secured to the ends of the barrel 25 and engaged with the outer portion of the pipe 31 for enclosing the annular chamber formed between the pipe 31 and the barrel 25 and for allowing the pipe 31 to be moved toward the housing 10 when pressurized air is supplied into the barrel 25 via the inlet 27. The air in the barrel 25 may flow out of the barrel 25 via the outlet 28 when the pipe 31 is moved away from the housing 10. It is preferable that a check valve is secured in the outlet 28 for allowing air to flow out of the barrel 25 only from the outlet 28. A ring 40 is secured to the pipe 31 and includes a pivot axle 41 having two bearings 42 engaged on the upper and the lower portions of the axle 41. The rear portion of the pipe 31 is engaged into the housing 10 via the orifice 22 of the pad 21.

A follower 34 is pivotally secured between the panels 23, 24 at a pivot pin 35 and includes a curved recess 36 for engaging with the bearings 42 of the axle 41 (FIGS. 3–5). One or two arms 37 are secured to the upper and the lower portions of the pivot pin 35. One or two actuators 38 are secured to the panels 23, 24 and each includes a piston rod 39 secured to the arms 37 for rotating the follower 34 and thus for rotating the pipe 31 and the barrel 25. The follower 34 may be rotated to rotate the pipe 31 for aligning the pipe 31 with either of the openings 18, 19 (FIGS. 4, 5). The bearings 42 and the axle 41 may be moved across the pivot pin 35 such that the axle 41 and thus the pipe 31 may be slightly moved away from the housing 10 and such that the pipe 31 may be slightly disengaged from the opening 18 (FIG. 4). The pipe 31 may be moved to engage with the opening 18, 19 (FIGS. 3, 5) when the air is supplied into the barrel 25 via the inlet 27, such that the slurry may be pumped into the pipe 31 from either of the tubes 11, 12.

In operation, as shown in FIG. 3, the slurry in the tube 11 may be pumped into the pipe 31 by the piston 15. At this moment, the slurry in the housing 10 may be drawn into the tube 12 by the piston 16. When the pipe 31 is rotated to engage with the opening 19 of the tube 12 (FIG. 5), the slurry in the tube 12 may be pumped into the pipe 31. At this moment, the slurry in the housing 10 may be drawn into the tube 11, such that the slurry may be continuously supplied into the pipe 31 by the cylinders 13, 14 alternatively. The slurry may thus be easily pumped and supplied to the upper or higher portion.

Accordingly, the slurry supplying mechanism in accordance with the present invention includes two cylinders for pumping slurry alternatively and for supplying slurry to the higher portion.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A mechanism for pumping and or supplying slurry, said mechanism comprising:

a housing for receiving the slurry, said housing including a first opening and a second opening, a first cylinder and a second cylinder secured to said housing and communicating with said first opening and said second opening for allowing said first and said second cylinders to draw the slurry into and out of said first and said second cylinders, a pipe pivotally secured to said housing and including a first end adapted to be aligned with either of said first opening and said second opening, and means for selectively aligning said first end of said pipe with said first opening and said second opening and for allowing the slurry to be supplied into said pipe by said cylinders alternatively, said selectively aligning means further including means for selectively forcing said pipe toward and to engage with said first and said second openings, said forcing means including a barrel rotatably secured to said housing, said pipe including a sealing ring engaged with said barrel for making an air tight seal between said barrel and said pipe, and said barrel including and inlet for allowing air to be supplied into said barrel and for selectively forcing said pipe toward and to engage with said first and said second openings, said pipe including an axle, said housing including a pivotal follower for engaging with said axle and for rotating said pipe, and said selectively aligning means including means for rotating said follower and for rotating said pipe.

2. A mechanism according to claim 1, wherein said follower includes a recess for engaging with said axle and for rotating said pipe when said follower is rotated.

3. A mechanism according to claim 1, wherein said rotating means includes at least one arm secured to said pivotal follower, and at least one actuator secured to said arm for rotating said arm and thus for rotating said follower and said pipe.

* * * * *